United States Patent [19]
Worley

[11] Patent Number: 5,552,925
[45] Date of Patent: Sep. 3, 1996

[54] ELECTRO-MICRO-MECHANICAL SHUTTERS ON TRANSPARENT SUBSTRATES

[75] Inventor: Eugene R. Worley, Irvine, Calif.

[73] Assignee: John M. Baker, Corona, Calif.; a part interest

[21] Appl. No.: 117,532

[22] Filed: Sep. 7, 1993

[51] Int. Cl.⁶ .................................................. G02B 26/02
[52] U.S. Cl. ........................ 359/230; 359/227; 359/234; 359/236
[58] Field of Search .................................. 359/290, 230, 359/227, 234, 236

[56] References Cited

U.S. PATENT DOCUMENTS

| | | | |
|---|---|---|---|
| 4,549,223 | 10/1985 | Ozawa | 359/55 |
| 5,062,689 | 11/1991 | Koehler | 359/230 |
| 5,078,479 | 1/1992 | Vuilleumier | 359/290 |
| 5,233,459 | 8/1993 | Bozler et al. | 359/227 |

*Primary Examiner*—James Phan
*Attorney, Agent, or Firm*—G. Donald Weber, Jr.

[57] ABSTRACT

A micro-mechanical shutter array using micro-mechanical technology and silicon-on-transparent-substrate technology. The micro-mechanical shutter array is operated by using electro-static forces. Two basic types of shutter movements are described, viz. an electric force/electric counter-force and an electric force/mechanical (spring) counter-force.

28 Claims, 4 Drawing Sheets

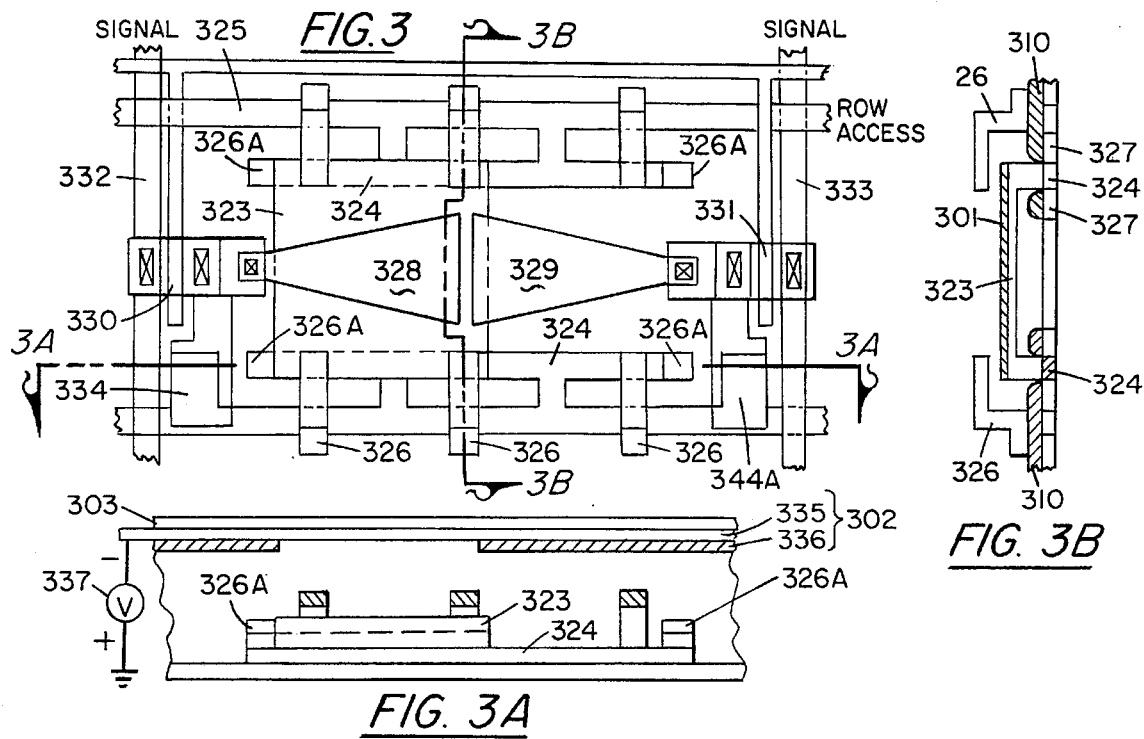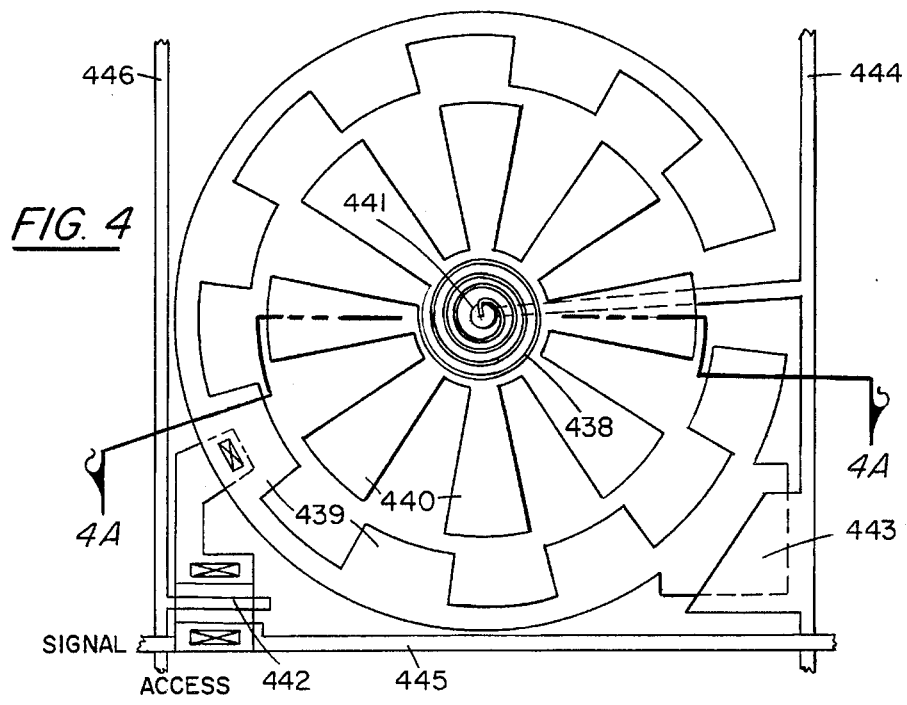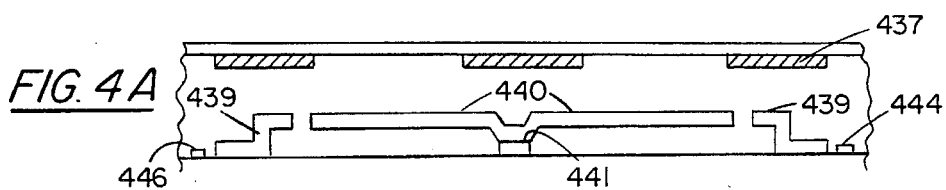

ELECTRO-MICRO-MECHANICAL SHUTTERS ON TRANSPARENT SUBSTRATES

BACKGROUND

1. Field of the Invention

This invention is directed to shutters, in general, and to micro-mechanical shutters mounted on transparent substrates and controlled by electro-static forces, in particular.

2. Prior Art

Numerous articles have appeared in technical journals describing how the techniques used to fabricate integrated circuits can be used to make micro-mechanical devices including micro-motors. Micro-motors are extremely small motors powered by an electric field rather than an electromagnetic field as is the case for conventional electric motors. The typical micro-motor is comprised of a bearing, a rotor, and a stator.

Integrated circuit techniques have also been applied to fabricate devices comprising silicon on transparent insulating substrates. Representative devices include Silicon-On-Sapphire (SOS) and polysilicon on glass. In SOS techniques, a silicon film, the crystalline quality of which approaches that of bulk silicon, has been used to fabricate high performance VLSI circuits. For example, SOS technology has been used to build integrated circuits of considerable complexity, such as 64K static RAMS. While polysilicon on glass is of much lower quality, it has been good enough to fabricate switch transistors for active-matrix liquid crystal displays (AMLCD).

U.S. Pat. No. 5,078,497 (Vuilleumier) describes a micro-mechanical shutter array which is electrostatically operated. This shutter uses latching flaps made of conductive material which are selectively deflected into recesses in the substrate. This device does not have switching transistors or storage capacitors. A twist-type spring acts as a counter force for the electric force. The shutter has only two latching states and, therefore, can be used only for text-type displays, not pictorial displays. Consequently, it lacks an "active matrix" in LCD terminology. Also, the deep recesses do not allow standard planar integrated circuit processing to fabricate these devices.

Silicon integrated circuit technology has been used to create micro-motors. These micro-motors are merely small spinning discs of silicon and as of yet have no practical application.

PRIOR ART STATEMENT

A preliminary patentability search has uncovered the following patents which are listed in numerical order without any special significance thereto.

U.S. Pat. No. 4,384,778; This patent shows a photographic camera exposure regulating element having a blade which moves to cover and uncover an aperture.

U.S. Pat. No. 4,564,836; This patent shows a shutter type display in which the shutters rotate under the effect of an electric field perpendicular to the plane of the carrier.

U.S. Pat. No. 4,778,254; This patent shows an optic fiber shutter having a blade moved by a magnetic field.

U.S. Pat. No. 4,880,293; This patent shows an optic fiber shutter having a blade moved by a magnetic field.

U.S. Pat. No. 5,055,832; This patent shows display elements using a notched rotating disk, the axis of rotation perpendicular to the light emission.

U.S. Pat. No. 5,078,479; Vuilleumier; This patent shows a display in which a light modulation device has electrostatic microflaps and means for matrix control.

The following publications are of interest and provide some pertinent background material which is incorporated herein.

Mehregany, Senturia, and Lang, "Measurement of Wear in Polysilicon Micromotors," IEEE Transaction on Electron Devices, vol. 39, no. 5, pp. 1136–1143, May 1992.

Bart, Mehregany, Tavrow, Lang, and Senturia, "Electric Micromotor Dynamics," IEEE Transaction on Electron Devices, vol. 39, no. 3, pp. 566–575, March 1992.

Mehregany, Senturia, Lang, and Nagarkar, "Micromotor Fabrication," IEEE Transaction on Electron Devices, vol. 39, no. 9, pp. 2060–2069, September 1992.

Fan, Tai, Muller, "Integrated Movable Micromechanical Structures for Sensors and Actuators," IEEE Transaction on Electron Devices, vol. 35, no. 6, pp. 724–730, June 1988.

Ratnam and Salama, "Novel High-voltage Silicon-On-Insulator MOSFET's," Solid-state Electronics, vol. 35, no. 12, pp. 1745–1750, 1992.

SUMMARY OF THE INSTANT INVENTION

Micro-mechanical technology and silicon-on-transparent-substrate technology are combined to produce a micro-mechanical shutter array. One type of transparent substrate is sapphire. The substrate of SOS circuits is transparent to visible light. Using this material in conjunction with micromotor technology, it is possible to realize an optical imager. This imager could, for example, be used to project high intensity images onto screens. Moreover, SOS devices can readily withstand temperatures of at least 200° C., unlike liquid crystal displays (LCD) which turn dark at much lower temperatures (e.g. about 80° C.). This type of array has many useful purposes such as, but not limited to, building electronic projectors analogous to LCD image projectors. The micro-mechanical shutter will be operated by using electric forces, in particular, electrostatic forces. Two basic types of shutter movements are described. One shutter movement is an electric force/electric counter-force type. The other shutter movement is an electric force/mechanical counter-force type. In the latter type, the mechanical counter-force is, typically, provided by a spring mechanism.

BRIEF DESCRIPTION OF THE DRAWINGS

FIG. 3 is a schematic, plan view of a slider embodiment of the shutter imaging system of the instant invention.

FIG. 3A is a sectional view of the embodiment shown in FIG. 3 taken along the line 3A—3A.

FIG. 3B is a sectional view of the embodiment shown in FIG. 3 taken along the line 3B—3B.

FIG. 4 is a schematic, plan view of another rotor embodiment of the shutter imaging system of the instant invention.

DESCRIPTION OF THE PREFERRED EMBODIMENTS

Figure 1:
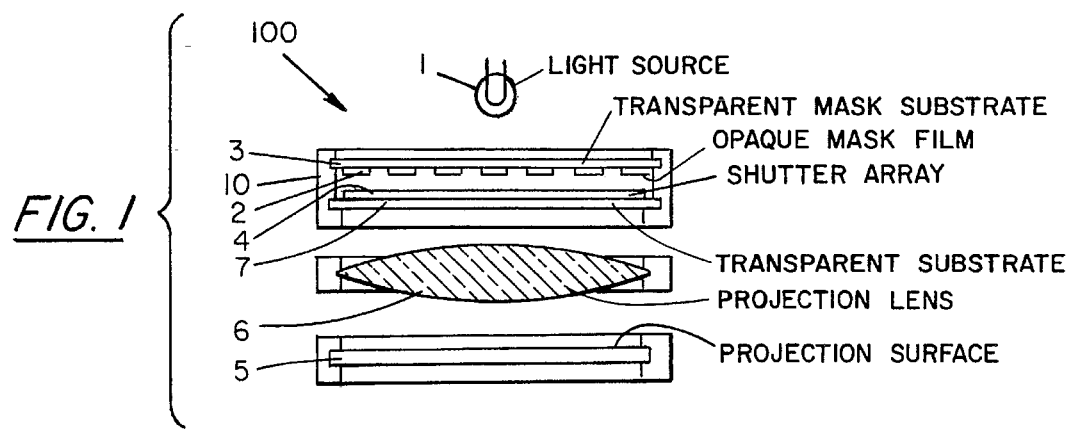
FIG. 1 is a cross-sectional, schematic representation of the micro-mechanical shutter imaging system of the instant invention.

Referring now to FIG. 1, there is shown a schematic diagram of one embodiment of the shutter imaging system of the instant invention. A light source 1, such as (but not limited to) an incandescent light bulb or the like, provides light which is to be selectively supplied to projection surface 5 via a shutter array 100. The shutter array includes a transparent layer 3 and an opaque masking layer 2 formed on substrate 3. The masking layer is formed in any suitable photolithic, photoetch or similar method. The opaque masking layer 2 is, preferably, formed on the inner surface of transparent substrate 3 for improved optical operation. Masking layer 2 is designed to allow light to shine on only those portions of shutter array 4 that can selectively gate light and to prevent light from shining on the portions of the shutter array 4 that support or control shutter operation, such as MOSFET switches, described infra.

The shutter array 4 (embodiments of which are described infra) is formed on a transparent substrate 7 (such as sapphire or other transparent material) using conventional integrated circuit (IC) processing techniques. The light which passes through the shutter array 4 (or pixels) forms an image which is projected onto screen 5. A suitable optical system represented by projection lens 6 can be used as desired.

The system generally shown in FIG. 1 is assembled in any suitable structure 10 which can include a hermetically sealed housing or the like. Moreover, any suitable arrangements can be used to avoid unwanted light refractions, reflections, divergence or the like.

As noted supra, this array can be used with electric force/electric counter-force or electric force/mechanical counter-force techniques. That is, an electric force/electric counter-force shutter operates by having a shutter position determined by the application of two electric potentials. The shutter will seek out an electric force equilibrium point which can be spatially moved by increasing one potential and decreasing the other. Conversely, in the electric force/ mechanical counter-force shutter, the electric force is countered by a mechanical force to establish the selected equilibrium point.

Electric Force/Electric Counter-Force Type Shutter

Figure 2:
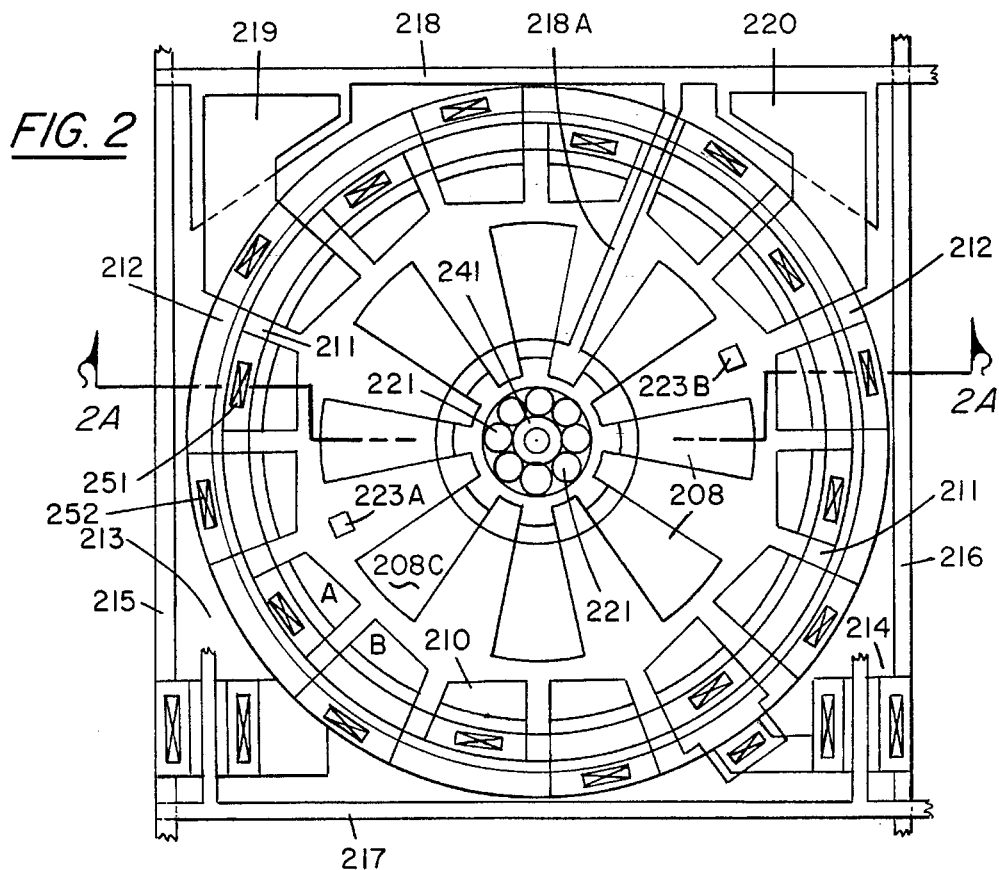
FIG. 2 is a schematic, plan view of one rotor embodiment of the shutter imaging system of the instant invention.

FIGS. 2 and 3 show examples of such shutter assemblies. These shutter assemblies are shown as the shutter array 4 and the substrate 7 in FIG. 1.

Figure 2A:
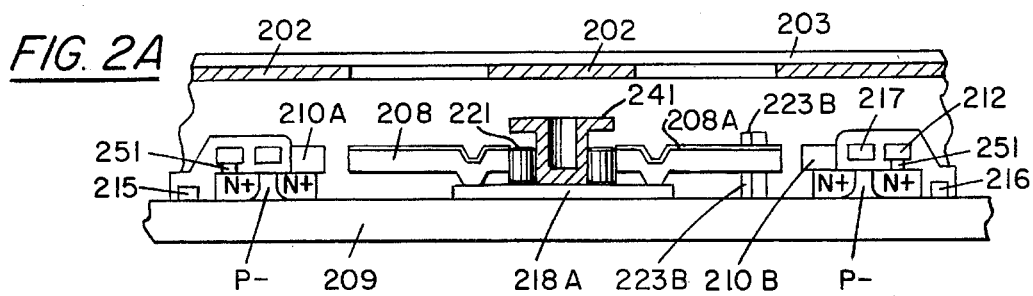
FIG. 2A is a sectional view of the embodiment shown in FIG. 2 taken along the line 2A—2A.

Referring now to FIGS. 2 and 2A, there are shown a plan and a sectional view, respectively, of one rotor embodiment of the invention. In this embodiment, the blades of the rotor selectively block (or unblock) the openings in the mask 202 on the substrate 203. This embodiment incorporates micromotor technology. The shutter mechanism is an adaptation of a micro-motor in which the rotor blades 208 function as the shutter and the substrate 209 is a transparent insulator (e.g. $Al_2O_3$, quartz, or glass) rather than bulk silicon.

Typically, the shutter can be made of polysilicon, which is the material used to make the rotor or micro-motors. Typically, deposited materials in an IC process are Al, polysilicon, $SiO_2$ (oxide), and silicon nitride. Polysilicon is used for micro-motors because it is hard and makes a good bearing material. Aluminum (Al) is, normally, too soft for this purpose. To make the polysilicon rotor opaque, a thin layer 208A of aluminum or a silicide can be applied to or formed on the top surface thereof.

The rotor 208 includes eight (8) blades. Any suitable number of blades can be utilized. The interior ends of blades 208 bear upon, and make electrical contact with, the ground pad 218A which can be fabricated of silicon or the like formed on the surface of substrate 209. An axial hub 241 is provided for the rotor. Bearings 221 (for example, roller bearings) are provided to reduce friction and wear at the rotor.

A plurality of stator poles 210 are peripherally provided at the outer ends of the rotor blades. The stator poles are formed in two sets, arranged in alternating positions, as poles 210A and 210B, respectively.

To control the position of the shutter or rotor 208, two different voltage levels are applied to the alternate stator poles 210A and 210B via metal conductor lines 211 and 212, respectively. The conductor lines are connected to the respective stator poles by contacts similar to contacts 251 and 252, respectively. Switch transistors 213 and 214 are, respectively, connected between the column select lines 215 and 216 and the conductor lines 211 and 212. The transistors 213 and 214 selectively supply the two different voltages to the cell by the conductors 211 and 212 in response to the application of a control voltage on the row address line 217. That is, upon application of the proper control signal to row access conductor 217 at the respective gate electrodes thereof, transistors 213 and 214 are turned on. The current path between the source and drain electrodes is, thus, enabled and the conductor lines 212 and 211 are connected to the respective SIGNAL and $\overline{\text{SIGNAL}}$ lines 215 and 216. A ground line 218 is also provided and is used to set the rotor potential to ground via ground pad 218A.

Capacitors 219 and 220 (including conductive layers adjacent to ground line 218) are used to hold the two potentials on the stators 210B and 210A, respectively, after the cell switch transistors 213 and 214 are turned off. The retention capacitors are designed to prevent leakage current through the switch transistors 213 and 214 from causing loss of proper stator voltage between scan cycles of the SIGNAL and $\overline{\text{SIGNAL}}$ lines.

The construction of the shutter assembly, including tapered stator poles 210A and 210B, is similar to the electric motor described in Mehregany et al., September, 1992, supra. The MOS transistors are fabricated using standard SOI fabrication techniques which are applied before the fabrication of the shutter assembly. Photoresist can be used to protect areas, such as the transistors, from the LTO etch which is used to release the rotor. Since voltages between 35 V and 200 V are, typically, required to operate the shutter, high voltage MOS transistors are preferred. Of course, SOI N channel transistors fabricated with drift regions have achieved breakdown voltages in excess of 400 V (see Ratnam et al. supra).

Rotor stops 223A and 223B are used to limit the rotor movement to only that rotational movement needed to gate the light passing through the array. For the eight (8) bladed rotor shown in FIG. 2, the rotor is restricted to a movement of slightly less than 22.5 degrees. The small extent of rotor motion significantly reduces the wear of the rotor 208, rotor bearing 221 and/or the hub 241.

The torque exerted on the rotor blades is given by $$\text{Torque} = 0.5 * R * V^2 * dC/d\Theta \tag{1}$$

where R=radius of the rotor blade,
V=voltage applied between the rotor and the stator,
C=capacitance between the rotor and the stator, and
Θ=rotor blade angle.

From the above equation it can be seen that if the rotor-to-stator spacing is constant with Θ, then the torque is roughly constant with Θ when the rotor blade edge is positioned anywhere within the angular extent of the stator.

One significant difference between the stator designs for the motor and the shutter is the taper of the stator pole required for the shutter. That is, each stator pole is tapered so that as the rotor moves deeper into the stator pole region, the electric torque generated by the stator pole diminishes. This feature is necessary to create an electric force equilibrium point which moves in response to changes in voltage on two adjacent stator poles which act on a given shutter blade.

For example, it is assumed that the voltage on stator pole 210A is increased and that the voltage on stator pole 210B is decreased. This action causes the individual rotor blade 208C to move toward pole 210A and away from pole 210B. As the rotor blade 208C moves in the direction of pole 210A (or increasing Θ), the torque diminishes (dC/dΘ) because the spacing between the leading edge of rotor blade 208C and the stator 210A increases. Conversely, the torque pulling the blade 208C back toward pole 210B increases. This process continues until the torque pulling blade 208C toward pole 210A equals the torque pulling the blade back toward pole 210B. Without the tapered design of the stator poles, the torque pulling the blade toward pole 210A would be stronger than the torque pulling the blade back toward pole 210B for all allowable angles of Θ until the stop 223 (A or B) is reached.

Referring now to FIGS. 3, 3A and 3B, there are shown a plan view, an elevational sectional view and an end sectional view of a slider-type shutter 300. The shutter is selectively moved to block the opening in the masking layer 336 of the overhead transparent substrate 303 to thereby block the light path therebetween. Alternatively, the shutter is moved to unblock this path. For this embodiment, an inverted U-shaped polysilicon slider 323 is used as the shutter. To make the polysilicon shutter opaque, a layer 301 of metal can be deposited on the top surface thereof. For SOS applications, the slider 323 slides on rails 324. Typically, the rails 324 are made of silicon and are used to ground the slider via the ground lines 325. Retainer posts 326 are used to prevent gravity from dislocating the slider 323 when the cell is not in operation.

In operation, the slider 323 is maintained in place by an electric force that is much stronger than the gravitational force. The electric force is provided by an electric potential between the slider 323 and the ground electrodes 328 and 329. The slider is adapted to move on the rails 324 between the guides 327 which are comprised of oxide-nitride layers placed on both sides of the rails. The nitride caps 310 on top of the guides 327 are used to prevent the oxide etch used to release the slider from attacking the guides 327. Two tapered, transparent electrodes 328 and 329 apply electric forces which move the slider back and forth, i.e. to open and close the shutter. That is, the slider selectively blocks and unblocks the opening between the mask components 302.

The electrodes 328 and 329 can be made of either thin silicon which is nearly transparent or indium tin oxide which is transparent. Voltages are applied to the electrodes 328 and 329 via access MOS transistors 330 and 331, respectively, which selectively connect the electrodes to the SIGNAL and $\overline{\text{SIGNAL}}$ lines 332 and 333. The transistors 330 and 331 are fabricated according to conventional IC techniques. Capacitors 334 and 334A are used for voltage retention between SIGNAL and $\overline{\text{SIGNAL}}$ line access functions. Slider stops 326A are used to constrain the lateral movement of the slider 323.

The position of the slider 323 is determined by the relative magnitude of the voltages applied to the transparent electrodes 328 and 329. If the voltage on electrode 329 is greater than the voltage on electrode 328, the slider moves to the right. The equilibrium position, i.e. the position where the two electric forces are equal, can be estimated by using the parallel plate formula. The lateral electric force which moves the slider 323 along the rails 324 is given by $$Fx = 0.5 * V^2 * dC/dx \tag{2}$$

where V=the voltage applied between the electrode and slider,
C=capacitance between the slider and the electrode, and
x=lateral displacement of slider.

The capacitance C is equal to E*Area/Dspace where E is the permitivity of space, Dspace is the distance from the bottom of the slider to the top of the transparent electrode, and A is the area of the intersection of the slider and either electrode 328 or 329.

Thus, the electric force is given by $$Fx = (0.5 * V^2 * Eo/Dspace) * dArea/dx \tag{3}$$

where Eo=permitivity of space,
Dspace=distance between the bottom of the slider and the electrodes, and
Area=Area of intersection between an electrode and the slider.

Applying Eq. (3) to the two electrodes and rearranging terms yields the equilibrium position which is given by $$X = (b*V1^2 - (m*Xo+a)*V2^{2+})/(m*(V1^2+V2^2)) \tag{4}$$

where x=slider position with x=o corresponding to the slider being at the rightmost extreme position allowed by the stop 306
b=width of the small end of the electrode trapezoid,
a=width of the large end of the electrode trapezoid,
L=length of the electrode trapezoid,
m=(a−b)/L, and
Xo=overlap of slider on right hand electrode 329 for X=O.

From Eq. (4), it can be seen that if voltage on electrode 329 (V1) is made to increase and the voltage on electrode 328 (V2) is made to decrease proportionately, the slider electric force equilibrium point, X, moves to the right. Conversely, if the voltage on electrode 329 (V1) is made to decrease and the voltage on electrode 328 (V2) is made to increase proportionately, the electric force equilibrium point, X, moves to the left. Thus, raising the voltage on one electrode and lowering the voltage on the other causes the slider to move either to the left or to the right, thereby modulating the light beam which passes through the shutter.

To reduce the friction produced by the electric field component that pulls the slider against the rail, a transparent electrode coating 335 (e.g. indium tin oxide) is deposited on the mask plate 363 in conventional fashion. After the deposition of the transparent conductive coating 335, the masking layer 336 is deposited which completes the composite 302. Electrode 335 produces a counter force to the force holding the slider against the rail 325. The magnitude of this counter-force can be adjusted by voltage from source 337 applied to the counter-force electrode 335.

One proposed fabrication sequence for this embodiment is:

1. Pattern the rails 324 and the cell ground electrodes 325 on the transparent insulator substrate 307 of silicon or polysilicon.
2. Fabricate MOS transistors 330 and 331 on substrate 307 using conventional MOS transistor fabrication techniques.
3. Deposit transparent electrode material and pattern the electrodes 328 and 329.
4. Deposit a layer of SiO2, followed by an SiN3 cap and pattern these two layers (as guide 327 and cap 310) between the silicon rails 324 produced in Step 1.
5. Deposit another layer of SiO2 with an SiN3 cap over the ground silicon rails 324 defined in Step 1.
6. Deposit another layer of SiO2 and pattern holes in it over the silicon rails 324 defined in Step 1.
7. Deposit polysilicon on the entire unit and etch to define slider 323.
8. Deposit another layer of SiO2 and etch holes over the areas to be used to anchor the retainer posts 326.
9. Deposit polysilicon on the unit and etch to define retainer posts 326.
10. Perform SiO2 etch to release or free slider 323. (Note that areas capped with SiN3 will not etch.)
11. Pattern contact holes in oxide for MOS transistors 330 and 331.
12. Deposit aluminum interconnects.

Electric Force/Mechanical Counter-Force Type Shutter

Figure 5:
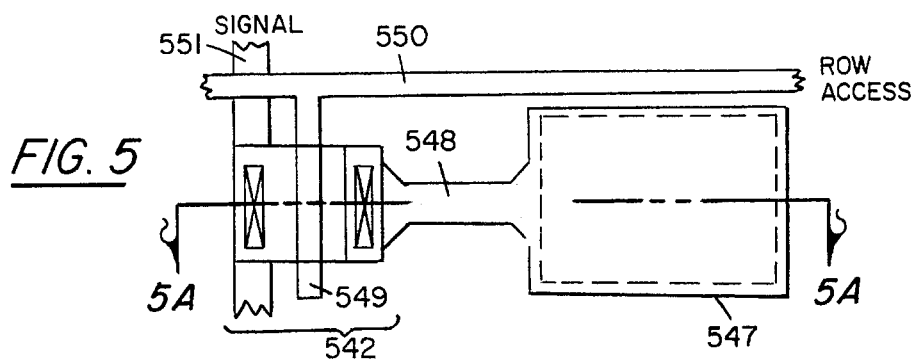
FIG. 5 is a flapper shutter imaging system of the instant invention.
Figure 8:
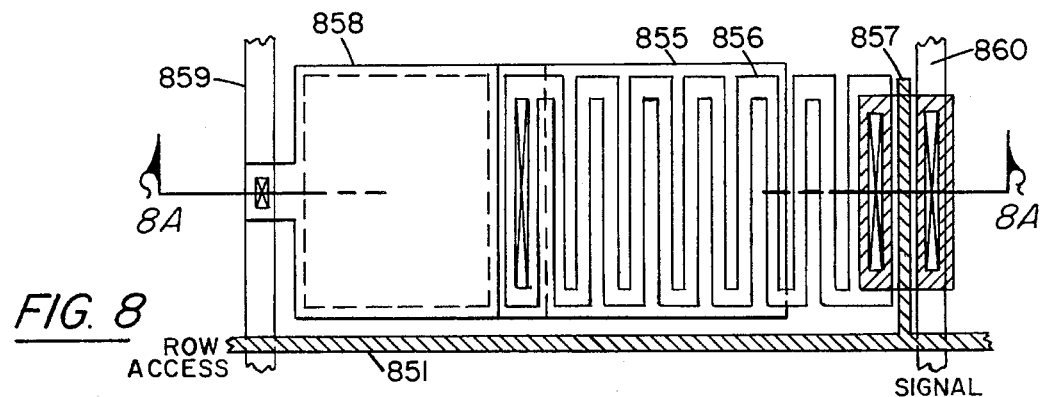
FIG. 8 is a schematic, plan view of an extendable spring embodiment of the shutter imaging system of the instant invention.

FIGS. 4, 5 and 8 show examples of such shutters. Referring now to FIG. 4, there is shown a plan view of a spiral spring version of the rotary shutter similar to the shutter shown in FIG. 2. FIG. 4A shows the cross-sectional view of the shutter shown in FIG. 4. In the embodiment of FIGS. 4 and 4A, the spiral spring 438 provides a mechanical counter-force to the force exerted by an electric field applied across the rotor-stator gap. In this embodiment, all of the stator poles 439 are joined together because the electric field is required to pull the rotor 440 in only one direction (e.g. clockwise in this embodiment). The spring 438 provides a counter-force that is proportional to the angle of displacement. Thus, the gap between the stator poles 439 and the rotor blades 440 is uniform (unlike the case for FIG. 2). The center post 441, which anchors the spiral spring 438 to the substrate, is connected to ground line 444 to establish ground potential at rotor 440.

An access MOS transistor 442 is used to selectively apply the control voltage to the stator 439 from the SIGNAL line 445. An access line 446 is used to turn the MOS transistor on and off. Retention capacitor 443 operates to retain the voltage on stator 439 after the access transistor 442 is shut off.

The spiral spring 438, the shutter 440, and the stator 439 can all be made of the same material. It has been demonstrated that a two and one half turn, polysilicon spiral spring can withstand a deflection of 300 degrees before failing. For the shutter of FIGS. 4 and 4A, a deflection of only 22.50 degrees is required to gate the light through the mask array 437 from completely "ON" to completely "OFF".

Equations were written describing the action of the spiral spring shutter of FIG. 4. The spring equation is found in the literature and the electric force is that given by Eq. (1). Aluminum can be used as the spring/rotor material because it is used in standard IC processing. In addition, aluminum has a relatively small value of Young's modulus which translates into smaller voltages being required to deflect the rotor. The following conditions were simulated in an embodiment using the aforementioned equations.

Rotor Material=Aluminum
Rotor Radius=30 um
Number of Spring Turns=3
Width of Spring Wire=1.5 um
Spacing of Spring Wire=1.5 um
Thickness of Spring Material=1.5 um
Rotor-Stator Gap=1.5 um
Number of Shutter Blades=8

The simulation output indicated that a voltage of almost 200 V would be required to achieve a 22.5 degree deflection which is the maximum required to produce 100% ON/OFF control of the masked light beam in the core of an 8-blade rotor. The shutter area was calculated to be 25% of the total area which compares very favorably with AMLCD displays. MOS transistors with drain drift regions can readily accommodate voltages of this magnitude.

Figure 5A:
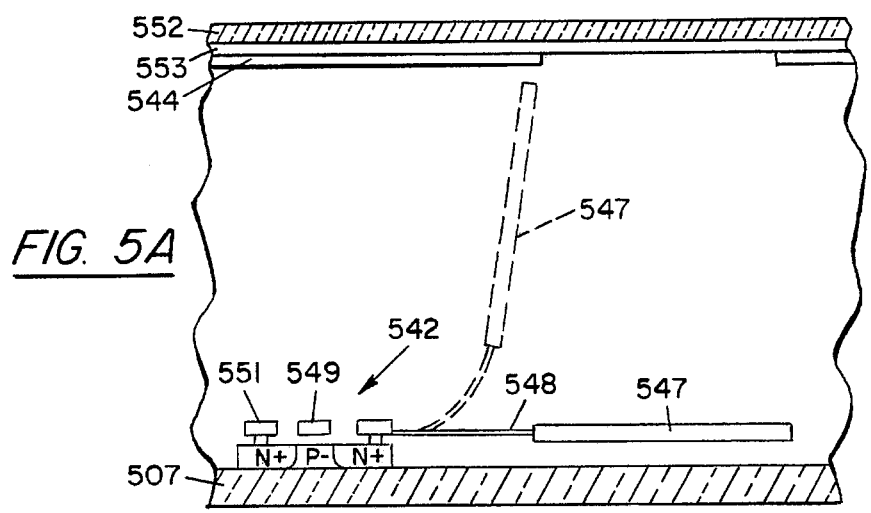
FIG. 5A is a sectional view of the embodiment shown in FIG. 5 taken along the line 5A—5A.

Referring now to FIGS. 5 and 5A, there is shown a "flapper" type micro light shutter used with a mask array as described. The light shutter comprises a flapper 547, and a SELECT MOSFET transistor 549 a row access line 550, and a column signal line 551 formed on substrate 507. Located above the shutter 547 is the light mask comprised of transparent substrate 552, a transparent ground electrode 553, typically, fabricated of indium tin oxide and the opaque blocking layer 554. When a voltage is applied between the flapper 547 and overhead ground plane 553, the electric force created thereby pulls the flapper 547 toward the plane 553. As the flapper 547 moves in response to the electric force, a counter-force is provided by the flat spring 548 which is easily provided in the form of a reduction in the width of flapper 547. As the voltage differential increases, the angle the flapper 547 makes with the substrate increases which in turn allows more light to pass through the transparent substrate 554.

Simulations were performed on the flapper micro-shutter of FIG. 5 using numerical techniques to calculate beam bending and using a modification of the parallel plate formula for calculating the electric force used to bend the flapper. As an example of a typical result, the following conditions were simulated:

Spring Length=6.0 um,
Spring Width=4.00 um,
Flapper Plate Width=18.0 um,
Flapper Plate Length=18.0 um,
Distance from Flapper (V=OV) to Ground Electrode=24 um, Spring Thickness=500 Å, and Spring Material=Aluminum.

Figure 6:
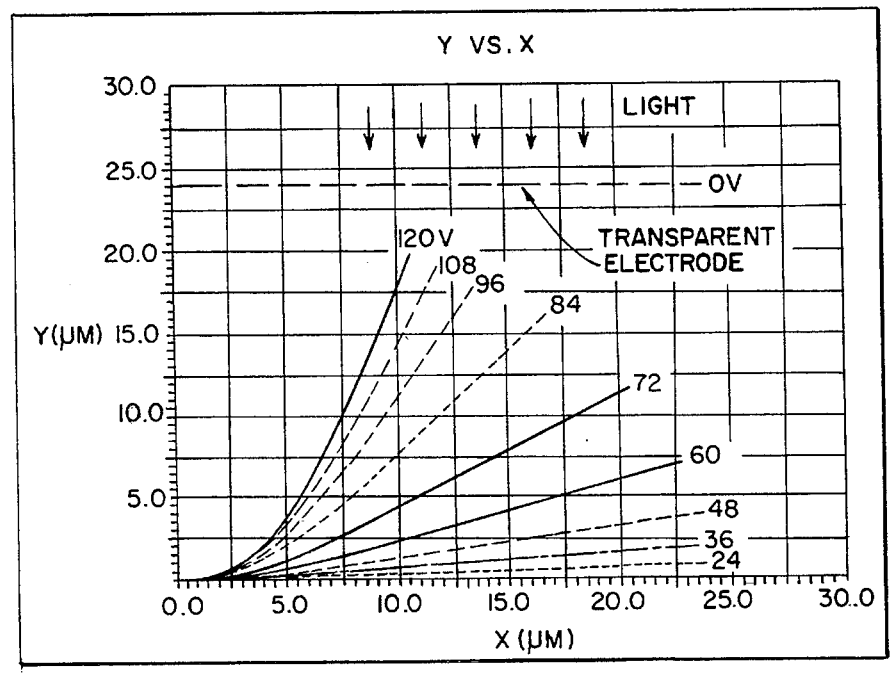
FIG. 6 is a graphical representation of the position of the flapper in response to various applied voltages.

Referring now to FIG. 6, there is shown a plot of the cross-section of the flapper 547 for various applied voltages. Note that as the flapper 547 bends upward toward the transparent ground electrode 553 with increasing voltage, more area between the mask components is unblocked by the flapper plate 547.

Figure 7:
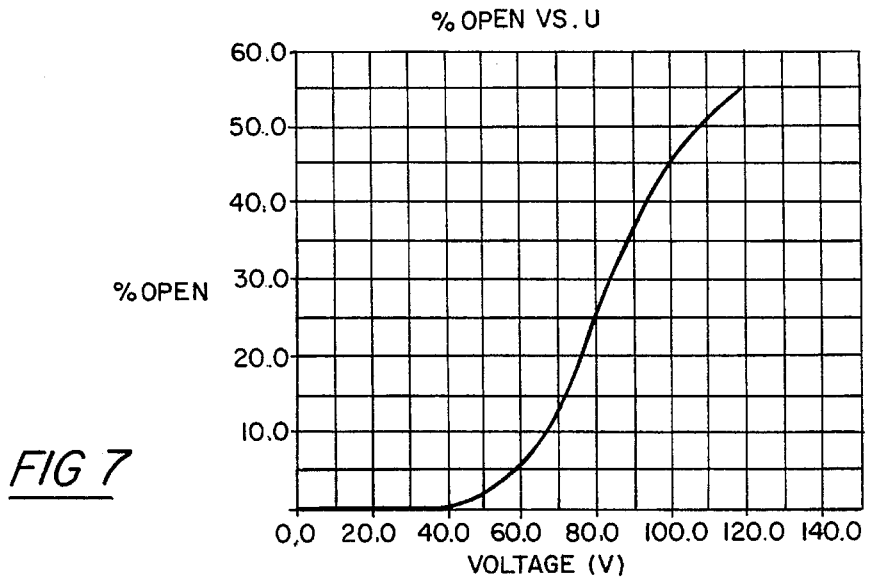
FIG. 7 is a graphical representation of the open percentage of the flapper in response to various applied voltages.

Referring now to FIG. 7, there is shown the percentage the mask is open (to allow light to pass) versus voltage applied to the flapper plate 547. For the first 50 V or so, the plate 547 hardly responds and the mask remains blocked. After this "offset" voltage has been applied, the plate 547 responds vigorously to the applied voltage because the closer the flapper 547 gets to the transparent electrode 553, the stronger the bending force. Finally, at large voltages, the flapper 547 approaches a nearly vertical position (as depicted in FIG. 6) which reduces the electro-static cross-section of the plate 547 thereby reducing the rate at which the electric force increases with increasing voltage. Thus, the rate at which the flapper 547 bends upwardly decreases causing the rate at which the flapper 547 opens to decrease. At 120 V, the mask aperture covered by flapper 547 is 55% open.

It is desirable to minimize the voltage required to open and close the shutter 547 to simplify the design of the transistor 542 required to access the flapper 547 electrode. A reduction in operating voltage can be achieved by biasing the overhead transparent electrode 553 by the negative value of the offset voltage. For example, when a −60 V bias is applied to the transparent electrode 553, the application of +60 V to flapper 547 via transistor 542 causes the shutter to go from 5% open to 55% open. The opaque mask 554 can be designed to block the light path when the shutter is 5% open. Thus, a signal of 60 V is all that is required to switch from 0 to 50% light transmission through the shutter.

Figure 8A:
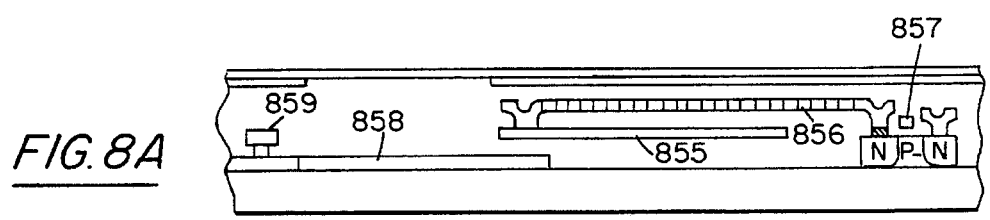
FIG. 8A is a sectional view of the embodiment shown in FIG. 6 taken along the line 6A—6A.

Referring now to FIGS. 8 and 8A there is shown an expandable spring version of the micro shutter. A flat conducting plate 855, which is used as the shutter, is connected to one end of an elongated, expandable spring 856. The shutter plate 855 and the "snake" spring 856 are disposed as different levels or layers of metal. The opposite end of the snake spring 856 is attached to the drain electrode of the MOS access transistor 857. When activated by a signal on the row access line 851, transistor 857 applies the signal voltage on signal line 860 to the spring/plate combination. Below the shutter plate 855 is a transparent ground plane 858 which is connected to the ground line 859 for the cell.

When a voltage is applied to the shutter plate 855, an electric force pulls the shutter plate 855 to the left and downward. As the potential increases, the plate 855 will move further to the left as the force equilibrium point moves to the left. As the plate moves to the left, the mask opening is closed thereby. The component of the electric force moving the plate 855 to the left will eventually be counterbalanced by the force of spring 856 pulling the plate 855 to the right.

The downward pull toward the ground plane 858 relative to the lateral pull can be reduced by making the gap between the shutter plate 855 and the ground plane 858 as large as possible. Also, the spring 856 can be stiffened to reduce bending downward (relative to lateral bending) by increasing the spring metal thickness relative to the width thereof. Similarly, the spring width at the turning points is increased to minimize bending at these points during the extension of the spring.

Figure 9:
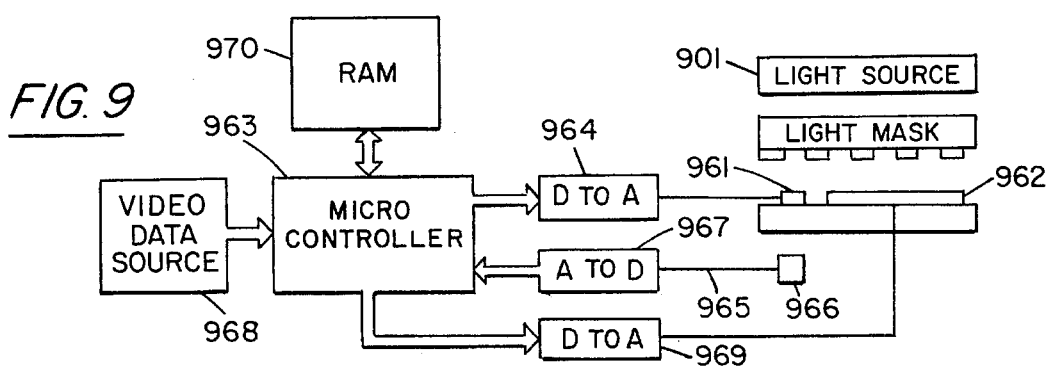
FIG. 9 is a schematic diagram of a calibration circuit for use with the shutter imaging system of the instant invention.

Referring now to FIG. 9, there is shown a schematic diagram of one embodiment of an automatic linearity calibration circuit for use with the shutter array imaging system of the instant invention. Most of the various shutter types recited herein have varying degrees of non-linear light output in response to the signal voltage input to the cell. Also, process variations can cause the light-output to voltage-response of the shutter to vary. This condition can be remedied by providing a small group of calibration cells 961 adjacent to the shutter array 962. During power up, the micro-controller 963 supplies a voltage ramp signal to the cells of the calibration array 961 via the D to A converter 964. A calibration voltage is produced on line 965 by a linear light sensing diode 966 and fed back to the micro-controller 963 via the A to D converter 967. The voltage is representative of the light passing through the imaging array from a projection light source 901. From this voltage, the micro-controller 963 calculates the weighting coefficients required to produce a linear light output in response to the digitized video signal from source 968. (The video signal can be supplied by any suitable source, such as, but not limited to, a VCR, a television receiver, a computer, or the like. Typically, the digitized video signal comes from an analog video signal processed by a high speed A to D converter.)

The weighting coefficients are stored in a conventional RAM 970. Using the video signal from source 968 in digital form, the micro-controller 963 then supplies the corrected or processed video signal to a D to A converter 969 the output of which drives the signal lines of the shutter array. That is, the micro-controller 963 transforms the digitized video signal to a shutter voltage such that the light output from the shutter is linear with magnitude of the video signal.

Thus, there is shown and described a unique design and concept of micro-mechanical shutters which use conventional IC processing technology. The particular configuration shown and described herein relates to micro-mechanical shutters on transparent substrates as controlled by electrostatic forces. While this description is directed to a particular embodiment, it is understood that those skilled in the art may conceive modifications and/or variations to the specific embodiments shown and described herein. Any such modifications or variations which fall within the purview of this description are intended to be included therein as well. It is understood that the description herein is intended to be illustrative only and is not intended to be limitative. Rather, the scope of the invention described herein is limited only by the claims appended hereto.

I claim:

1. Control apparatus for selectively blocking radiation comprising, substrate means which is transparent to a radiation signal, shutter means movably mounted on said substrate means, said shutter means fabricated of a material which is electrically conductive and non-transparent to said radiation signal, electrode means mounted on said substrate means adjacent to said shutter means, said electrode means fabricated of a material which is electrically conductive, gating means mounted on said substrate means and electrically connected to at least one of said shutter means and said electrode means, and signal supplying means mounted on said substrate means for supplying electric signals to said electrode means and to said shutter means via said gating means to selectively apply an electric force to said shutter means in order to move said shutter means relative to said substrate means.

2. The control apparatus recited in claim 1 including, mask means disposed substantially parallel to said substrate means and aligned with said shutter means.

3. The control apparatus recited in claim 2 wherein, said mask means and said shutter means include a plurality of mask units and a plurality of shutter units thereby providing a scanning array.

4. The control apparatus recited in claim 1 wherein, said substrate means is comprised of one of the materials in the class comprising silicon-on-sapphire, silicon-on-quartz and polysilicon-on-glass.

5. The control apparatus recited in claim 1 wherein, said gating means comprises MOS-type transistors.

6. The control apparatus recited in claim 5 wherein, said transistors selectively operate to produce analog voltage signals.

7. The control apparatus recited in claim 1 wherein, said signal supplying means includes control signal means for selectively applying control signals to said shutter means.

8. The control apparatus recited in claim 1 wherein, said signal supplying means includes capacitance means to retain a prescribed signal level thereat after the application of a control signal.

9. The control apparatus recited in claim 1 including, mechanical force applying means connected to said shutter means for supplying a mechanical counter-force to said shutter means which mechanical counter-force is in opposition to said electric force.

10. The control apparatus recited in claim 9 wherein, said mechanical force applying means comprises a resilient spring.

11. The control apparatus recited in claim 10 wherein, said resilient spring is a helical spring.

12. The control apparatus recited in claim 10 wherein, said resilient spring is an elongated, accordion spring.

13. The control apparatus recited in claim 1 including, calibration circuit means connected to said substrate means.

14. The control apparatus recited in claim 13 wherein, said calibration circuit means provides an automatic linearity calibration circuit.

15. The control apparatus recited in claim 14 wherein, said calibration circuit includes at least one calibration cell adjacent to said shutter means on said substrate means, signal means for activating each calibration cell, calibration signal means for supplying a calibration signal representative of radiation passing through said shutter means, and controller means for receiving said calibration signal to calculate weighting coefficients required to produce a linear output signal.

16. The control apparatus recited in claim 1 including, radiation source means for irradiating said mask means, and projection surface means for receiving radiation which passes through said mask means and said shutter means.

17. The control apparatus recited in claim 1 wherein, said shutter means comprises a monolithic micro-mechanical shutter.

18. The control apparatus recited in claim 17 wherein, said signal supplying means is fabricated using conventional integrated circuit techniques.

19. The control apparatus recited in claim 1 wherein, said shutter means provides a rotary motion relative to said substrate means.

20. The control apparatus recited in claim 1 wherein, said shutter means provides a sliding motion relative to said substrate means.

21. The control apparatus recited in claim 1 wherein, said shutter means provides a bending motion relative to said substrate means.

22. The control apparatus recited in claim 1 wherein, said shutter means provides a cantilevered motion relative to said substrate means.

23. The control apparatus recited in claim 1 wherein, said electrode means comprise tapered electrodes.

24. The control apparatus recited in claim 1 wherein, said electrode means surround said shutter means.

25. The control apparatus recited in claim 24 wherein, said electrode means include a plurality of electrodes which are arranged to alternate in polarity relative to the electric signal supplied thereto.

26. The control apparatus recited in claim 1 wherein, said signal supplying means comprises row and column conductors connected to said shutter means whereby said shutter means can be selected for operation.

27. The apparatus recited in claim 1 wherein, said signal supplying means selectively and alternatively supplies signals to said electrode means and to said shutter means via said gating means to apply an electric counterforce to said shutter means to move said shutter means relative to said substrate means in the opposite direction relative to said electric force.

28. The control apparatus recited in claim 27 wherein, said shutter means is selectively moved to an equilibrium position determined by said electric force and said electric counter-force.

\* \* \* \* \*